US008028917B2

(12) United States Patent
Giebel

(10) Patent No.: US 8,028,917 B2
(45) Date of Patent: Oct. 4, 2011

(54) ADAPTIVE OPTIMIZATIONS FOR SIGNAL PROCESSING IN IMAGING READERS

(75) Inventor: James Giebel, Centerport, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 509 days.

(21) Appl. No.: 12/338,236

(22) Filed: Dec. 18, 2008

(65) Prior Publication Data

US 2010/0155486 A1 Jun. 24, 2010

(51) Int. Cl.
*G06K 7/10* (2006.01)
*G01J 1/32* (2006.01)
*H03G 3/20* (2006.01)

(52) U.S. Cl. .................. 235/462.26; 235/455; 250/205; 250/214 AG

(58) Field of Classification Search ............. 235/462.42, 235/462.25, 462.26, 454, 455, 462.41, 462.45; 250/205, 214 A, 214 AG; 348/229.1, 255
See application file for complete search history.

(56) References Cited

U.S. PATENT DOCUMENTS

| | | | | |
|---|---|---|---|---|
| 4,933,538 A | * | 6/1990 | Heiman et al. | 235/462.31 |
| 5,168,148 A | * | 12/1992 | Giebel | 235/462.26 |
| 5,612,529 A | * | 3/1997 | Coleman | 235/455 |
| 5,754,670 A | * | 5/1998 | Shin et al. | 382/321 |
| 7,303,126 B2 | * | 12/2007 | Patel et al. | 235/454 |
| 2005/0056699 A1 | * | 3/2005 | Meier et al. | 235/454 |
| 2007/0108283 A1 | * | 5/2007 | Thuries | 235/454 |
| 2007/0139515 A1 | * | 6/2007 | Du Breuil | 348/14.01 |
| 2009/0001163 A1 | * | 1/2009 | Barkan et al. | 235/454 |
| 2009/0244319 A1 | * | 10/2009 | Kim et al. | 348/229.1 |

* cited by examiner

*Primary Examiner* — Michael G Lee
*Assistant Examiner* — Suezu Ellis
(74) *Attorney, Agent, or Firm* — Nongqiang Fan

(57) ABSTRACT

An imaging reader includes an illuminating light assembly, an illuminating control operative to control either the intensity or the duration of the illumination light projected by the illuminating light assembly, and a solid-state imager. The solid-state imager includes a matrix of optical-sensors and a signal processing circuit coupled to the matrix of optical-sensors. The controller is operative to determine the optimized exposure level of the illuminating control and the optimized gain of the signal processing circuit based on a measured voltage of a voltage power source for the solid-state imager.

10 Claims, 3 Drawing Sheets

ADAPTIVE OPTIMIZATIONS FOR SIGNAL PROCESSING IN IMAGING READERS

FIELD OF THE DISCLOSURE

The present disclosure relates generally to imaging readers for reading bar code symbols.

BACKGROUND

Solid-state imaging systems or imaging readers, as well as moving laser beam readers or laser scanners, have both been used to electro-optically read targets, such as one-dimensional bar code symbols, particularly of the Universal Product Code (UPC) type, each having a row of bars and spaces spaced apart along one direction, as well as two-dimensional symbols, such as Code 49, which introduced the concept of vertically stacking a plurality of rows of bar and space patterns in a single symbol, as described in U.S. Pat. No. 4,794,239. Another two-dimensional code structure for increasing the amount of data that can be represented or stored on a given amount of surface area is known as PDF417 and is described in U.S. Pat. No. 5,304,786.

The imaging reader includes an imaging module having a solid-state imager with a sensor array of cells or photosensors, which correspond to image elements or pixels in a field of view of the imager, and an imaging lens assembly for capturing return light scattered and/or reflected from the symbol being imaged in a range of working distances from the imager, and for projecting the return light onto the sensor array to initiate capture of an image of the symbol. Such an imager may include a one- or two-dimensional charge coupled device (CCD) or a complementary metal oxide semiconductor (CMOS) device and associated circuits for producing and processing electronic signals corresponding to a one- or two-dimensional array of pixel information over the field of view.

The solid-state imager in the imaging reader generally has limited dynamic range that places limitations on the exposure level of the solid-state imager during barcode image capture. Such solid-state imager also has "fixed pattern noise" that degrades the quality of all captured images. It is desirable to maximize the signal processing fidelity of the solid-state imager and minimize the "fixed pattern noise" associated with the solid-state imager.

SUMMARY

In one aspect, the invention is directed to an imaging reader. The imaging reader includes a housing, an illuminating light assembly supported by the housing, an illuminating control operative to control either the intensity or the duration of the illumination light projected by the illuminating light assembly, a solid-state imager, and a controller. The solid-state imager includes a matrix of optical-sensors and a signal processing circuit coupled to the matrix of optical-sensors. The controller is operative to set an exposure level of the illuminating control to an optimized exposure level and operative to set the gain of the signal processing circuit to an optimized gain. The controller is operative to determine the optimized exposure level and the optimized gain based on a measured voltage of a voltage power source for the solid-state imager. In one implementation, the controller is operative to determine the optimized exposure level and the optimized gain optimized for the measured voltage based on a lookup table. Implementations of the invention can include one or more of the following advantages. It may improve the signal processing fidelity of the solid-state imager and minimize the "fixed pattern noise" associated with the solid-state imager. In a specific example, as the power supply voltage is reduced, the performance of the sensor is compromised as the headroom of circuits in the signal processing path, including the pixels, gets reduced. Circuit linearity and matching characteristics are compromised as the power supply is reduced. By sensing the power supply voltage, the system can react and make changes to reduce this impact. These and other advantages of the present invention will become apparent to those skilled in the art upon a reading of the following specification of the invention and a study of the several figures of the drawings.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
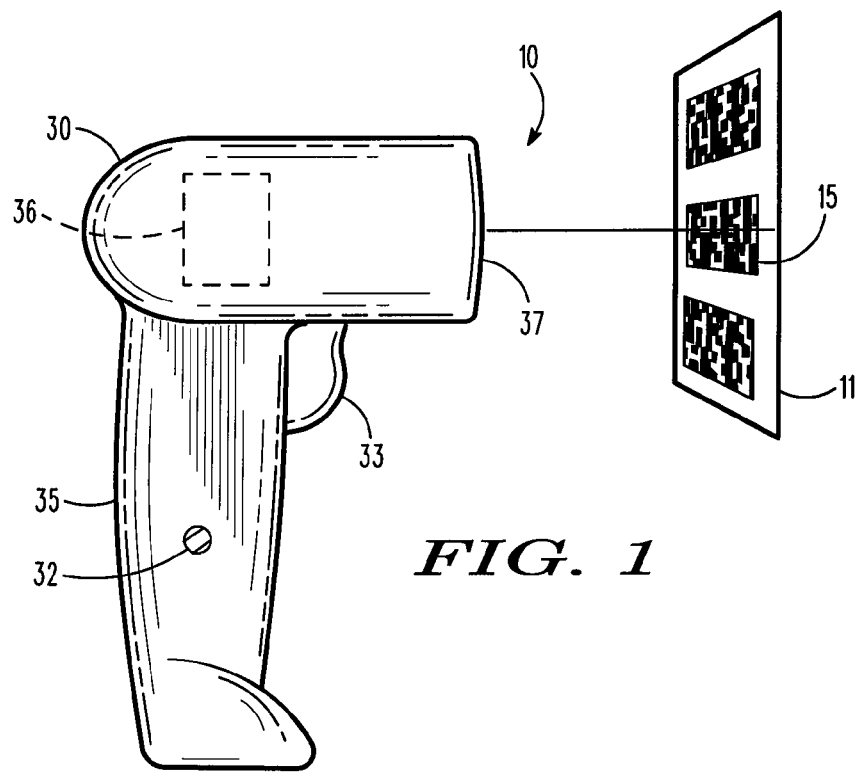
FIG. 1 shows a handheld imaging reader acting upon a surface having a plurality of two-dimensional barcodes.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

FIG. 1 shows a handheld imaging reader 10 acting upon a surface 11 having a plurality of two-dimensional barcodes 15. For the purposed of this description, a handheld imaging reader will be discussed. However, it will be apparent to one of ordinary skill in the art that the techniques and devices described herein can be practiced advantageously with stationary or bi-optic imaging readers. The handheld imaging reader 10 includes a housing 30 having a handle portion 35 adapted to be gripped by a user. A scan engine 36 that includes scanner components that perform functions such as imaging, control, and optionally, decoding is mounted within the head of the scanner. A user actuated mode switch 32 is also located on the handle portion.

The imaging reader emits a focused aiming line 20 that is aimed by the user at the particular barcode 15 that is presently being read. The aiming pattern can be activated by a trigger 33, followed by full-scale illumination of the target area. Alternatively, the aiming pattern can be active at all times in which case the trigger 33 activates full-scale illumination of the target. The light emitted from the imaging reader exits the imaging reader through a window 37 and light reflected back from the target surface passes through the window to imaging components within the scanner.

Figure 2:
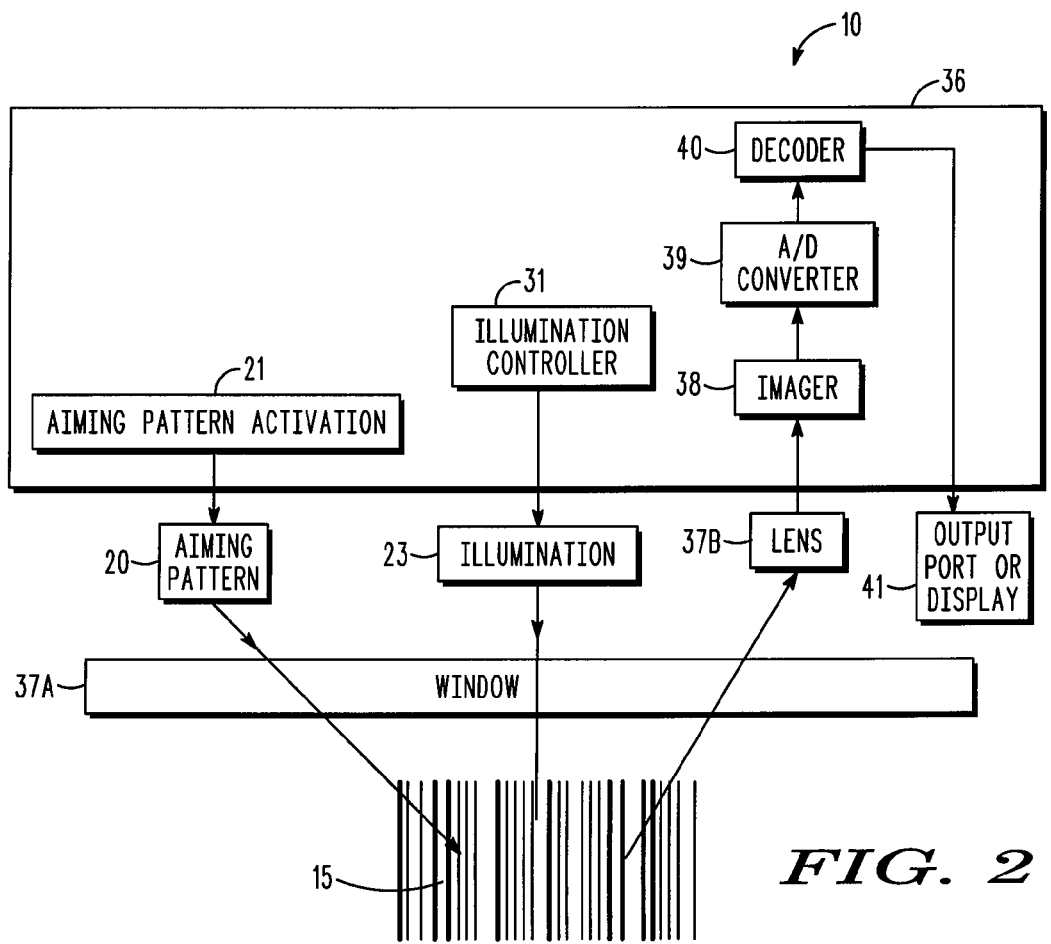
FIG. 2 is a functional block diagram of an imaging reader.

FIG. 2 is a functional block diagram of an imaging reader. The scan engine 36 includes an imager 38 having a two-dimensional array of sensors such as CCD or CMOS sensors that sense light reflected back from the target surface and form pixel data corresponding to an image of the target. It is advantageous to use an array sensor that has the capability to output a portion of pixels upon request, so that the transfer time and processing time can be shortened when only a portion of the array is properly exposed. The pixel data from the array is converted into digital data by an A/D converter 39 that is decoded by decoder 40. The A/D converter 39 and decoder 40 are not incorporated in all scan engines and may be housed in separate scanner components. An output port or display 41 provides the results of decoding to a peripheral device (not shown) or displays them to the user. The imaging reader 10 also includes an illumination source 23 that is capable, within a prescribed scanner range, of illuminating a portion of the target surface sufficient to fill the entire two-dimensional array of sensors with data. The illumination source 23 is generally controlled by an illumination controller 31. The illumination controller 31 can control an exposure level by changing the intensity or the duration of the illumination light projected by the illumination source 23. The imaging reader includes an aiming pattern generator 20 that can be activated by a user actuated aiming pattern activation device 21.

Figure 3:
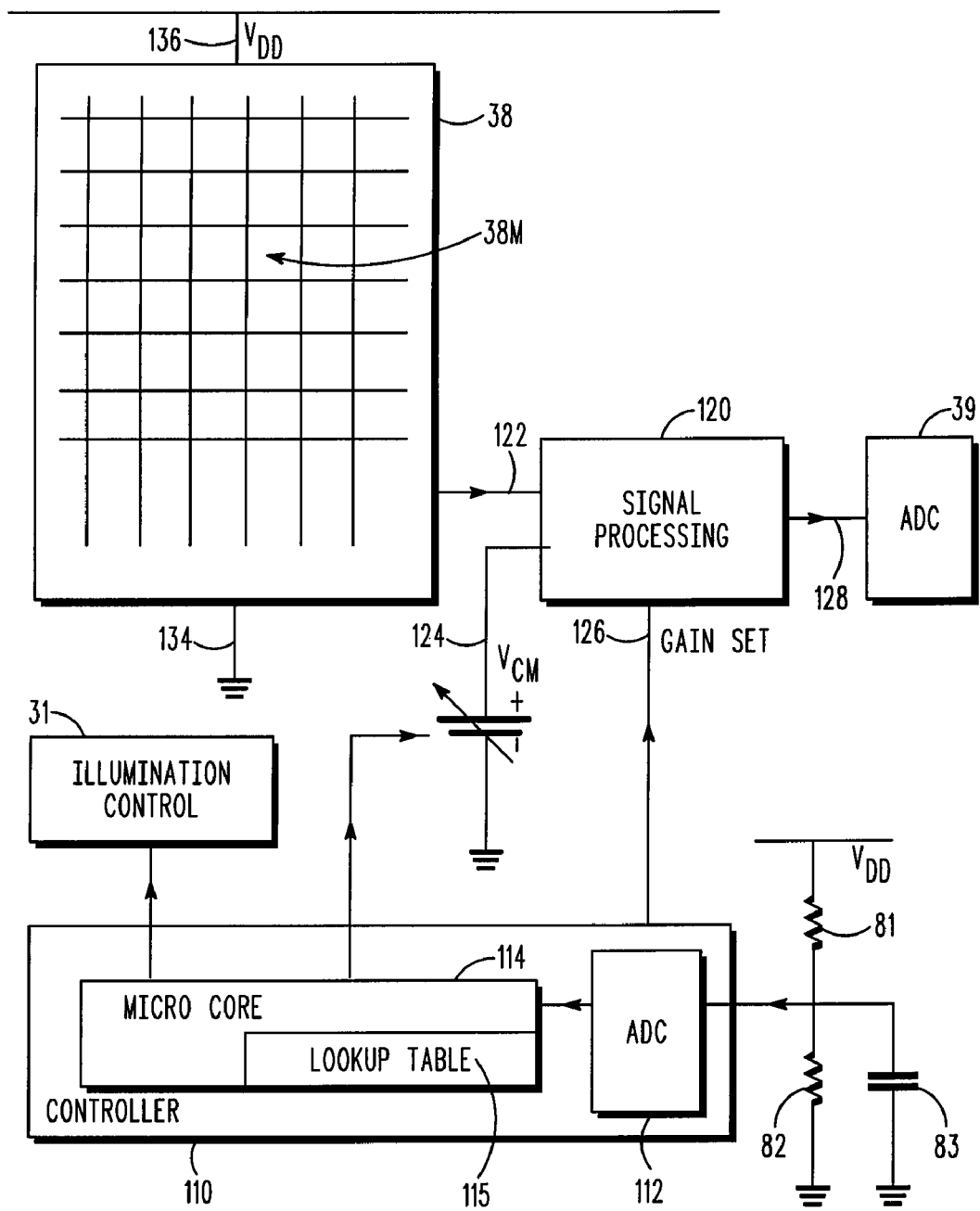
FIG. 3 shows a block diagram of an electronic circuit for improving the signal processing fidelity and the "fixed pattern noise" of the solid-state imager in accordance with some embodiments.

FIG. 3 shows a block diagram of an electronic circuit for improving the signal processing fidelity and the "fixed pattern noise" of the solid-state imager in accordance with some embodiments. The solid-state imager 38 includes a matrix of optical-sensors 38M and a signal processing circuit 120 coupled to the matrix of optical-sensors 38M. The signal processing circuit 120 can be part of the solid-state imager 38 and can be implemented on the same silicon chip on which the matrix of optical-sensors are implemented. The signals from the matrix of optical-sensors 38M can be coupled to a first input 122 of the signal processing circuit 120. The signals at the first input 122 of the signal processing circuit 120 can be subtracted by a common voltage $V_{CM}$ and subsequently amplified by the signal processing circuit 120. Both the common voltage $V_{CM}$ of the signal processing circuit 120 and the gain of the signal processing circuit 120 can be controlled with a controller 110. The signal at an output 128 of the signal processing circuit 120 is coupled to the analog-to-digital converter and is digitized for further signal processing.

For improving the signal processing fidelity and for reducing the "fixed pattern noise" of the solid-state imager, the controller can set an exposure level of the illuminating control 31 to an optimized exposure level and set the gain of the signal processing circuit 120 to an optimized gain based on a measured voltage of an voltage power source $V_{DD}$ applied to the solid-state imager 38. In some implementations, any one, or perhaps all of the settings can be optimized. In one implementation, the voltage of the voltage power source $V_{DD}$ is measured with a voltage divider that includes resistors 81 and 82. A capacitor 83 can be connected to resistors 81 and 82 to form a low-pass filter to filter out high frequency noises. The voltage across the resistor 82 can be digitized with an analog-to-digital converter 112. The measured voltage of the voltage power source $V_{DD}$ in the digitized form can be used by the controller 110 to determine the optimized exposure level for the illuminating control 31 and the optimized gain for the signal processing circuit 120. In one implementation, the optimized exposure level for the illuminating control 31 and the optimized gain for the signal processing circuit 120 can be determined base on a lookup table 115. In some implementations, the measured voltage of the voltage power source $V_{DD}$ in the digitized form can also be used by the controller 110 to determine the optimized common voltage for the signal processing circuit 120. This optimized common voltage can also be determined based on the lookup table 115. While the optimal value for these settings can be influenced by the power supply voltage measurement, in some implementations, the system is ultimately free to consider others factors in producing this final setting value.

Figure 4:
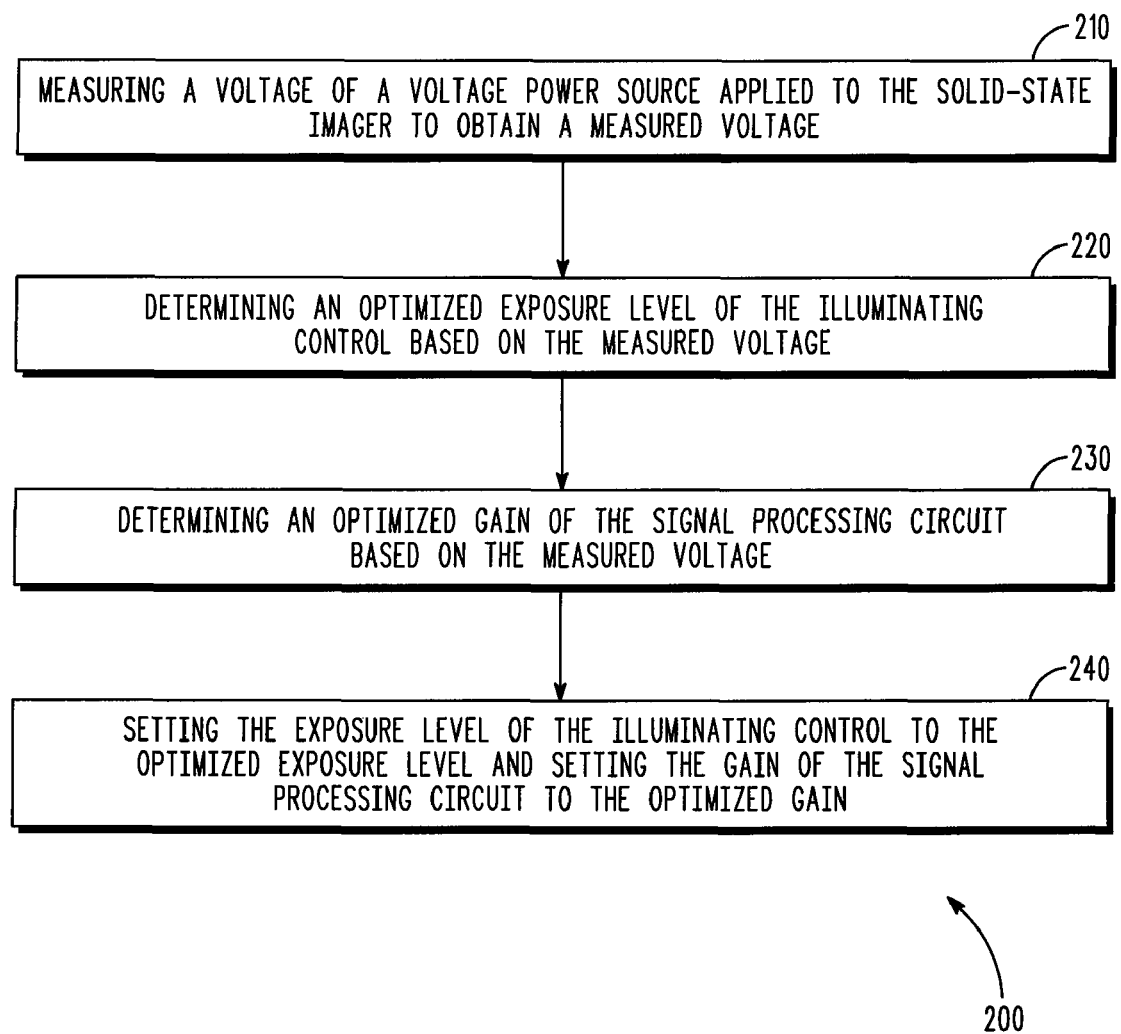
FIG. 4 shows a method 200 for improving the signal quality of an imaging reader that includes a solid-state imager having a matrix of optical-sensors.

FIG. 4 shows a method 200 for improving the signal quality of an imaging reader that includes a solid-state imager having a matrix of optical-sensors. The imaging reader generally can also include an illuminating light assembly and an illuminating control. In the imaging reader, a signal processing circuit is coupled to the matrix of optical-sensors. The method 200 includes blocks 210, 220, 230, and 240. Block 210 includes measuring a voltage of a voltage power source applied to the solid-state imager to obtain a measured voltage. Block 220 includes determining an optimized exposure level of the illuminating control based on the measured voltage. Here, the illuminating control is operative to control either the intensity or the duration of the illumination light projected by the illuminating light assembly. Block 230 includes determining an optimized gain of the signal processing circuit based on the measured voltage. Block 240 includes setting the exposure level of the illuminating control to the optimized exposure level and setting the gain of the signal processing circuit to the optimized gain.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for improving an imaging reader that includes an illuminating light assembly, an illuminating control, a solid-state imager having a matrix of optical-sensors, and a signal processing circuit coupled to the matrix of optical-sensors, the method comprising:

measuring a voltage of a voltage power source applied to the solid-state imager to obtain a measured voltage;

determining an optimized exposure level of the illuminating control, wherein the illuminating control is operative to control either the intensity or the duration of the illumination light projected by the illuminating light assembly;

determining an optimized gain of the signal processing circuit based on the measured voltage; and setting the exposure level of the illuminating control to the optimized exposure level and setting the gain of the signal processing circuit to the optimized gain.

2. The method of claim 1, further comprising:

digitizing the measured voltage with an analog-to-digital converter.

3. The method of claim 1, wherein the determining an optimized exposure level of the illuminating control comprises:

determining an optimized exposure level of the illuminating control based on a lookup table.

4. The method of claim 1, wherein the determining an optimized gain of the signal processing circuit comprises:

determining an optimized gain of the signal processing circuit based on a lookup table.

5. The method of claim 1, further comprising:

determining an optimized common voltage of the signal processing circuit optimized for the measured voltage; and setting the signal processing circuit to have the optimized common voltage.

6. The method of claim 5, wherein the determining an optimized common voltage of the signal processing circuit comprises:

determining an optimized common voltage of the signal processing circuit based on a lookup table.

7. An imaging reader comprising:

a housing;

an illuminating light assembly supported by the housing for illuminating an optical indicia with illumination light;

an illuminating control operative to control either the intensity or the duration of the illumination light projected by the illuminating light assembly;

a solid-state imager having a matrix of optical-sensors and a signal processing circuit coupled to the matrix of optical-sensors, the signal processing circuit having a common voltage and a gain, wherein both the common voltage of the signal processing circuit and the gain of the signal processing circuit are controllable; and a controller operative to set an exposure level of the illuminating control to an optimized exposure level and operative to set the gain of the signal processing circuit to an optimized gain and, wherein the controller is operative to determine any of these optimized settings based on a measured voltage of a voltage power source for the solid-state imager.

8. The device of claim 7, wherein the controller is operative to determine the optimized exposure level and the optimized gain optimized for the measured voltage based on a lookup table.

9. The device of claim 7, wherein the controller is further operative to set the common voltage of the signal processing circuit to an optimized common voltage optimized for the measured voltage.

10. The device of claim 9, wherein the controller is operative to determine the optimized exposure level, the optimized gain, and optimized common voltage based on a lookup table.

* * * * *